United States Patent [19]

Palochak

[11] Patent Number: 4,927,087
[45] Date of Patent: May 22, 1990

[54] ICE SHAVING SYSTEM

[76] Inventor: John B. Palochak, 227 Chico Avenue, Santa Cruz, Calif. 95060

[21] Appl. No.: 360,858

[22] Filed: Jun. 2, 1989

[51] Int. Cl.⁵ .............................................. B02C 18/42
[52] U.S. Cl. .............. 241/100.5; 241/282.1; 241/DIG. 17
[58] Field of Search ............... 241/100.5, 282.1, 282.2, 241/46 B, 257 G, DIG. 17

[56] References Cited

U.S. PATENT DOCUMENTS 2,832,546  4/1958  Sprague .................... 241/100.5 X
2,953,308  9/1960  Isola ........................ 241/100.5 X Primary Examiner—Mark Rosenbaum
Attorney, Agent, or Firm—John J. Morrissey

[57] ABSTRACT

An ice shaving system for domestic purposes is formed by coupling the shaft on which a rotary blade of a food processor is mounted to the drive shaft of the motor of garbage disposal unit located under a kitchen sink.

12 Claims, 2 Drawing Sheets

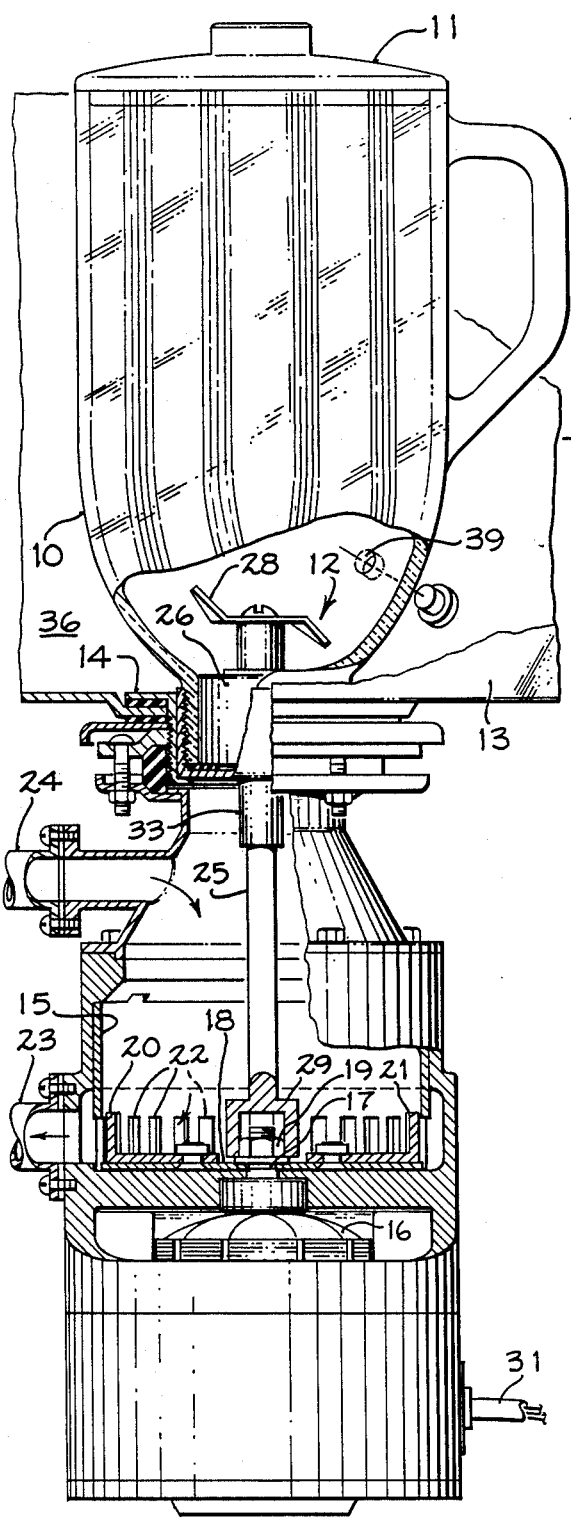
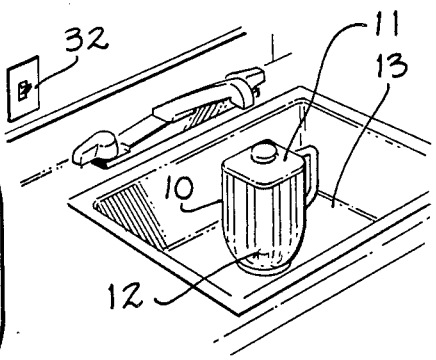
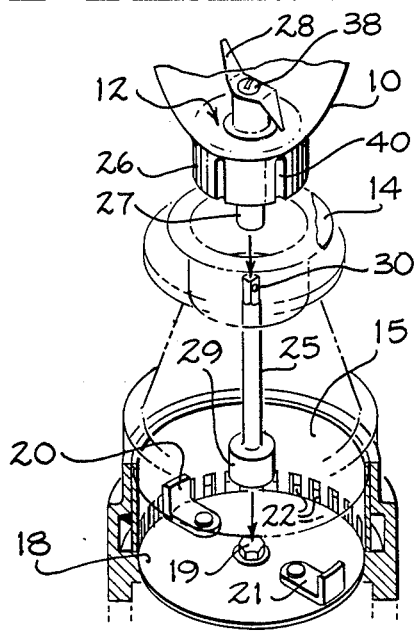
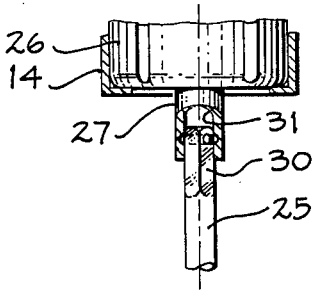
FIG_1
FIG_2
FIG_3
FIG_4

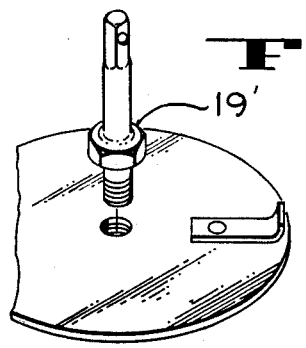
FIG_9
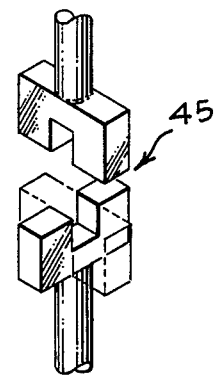
FIG_5
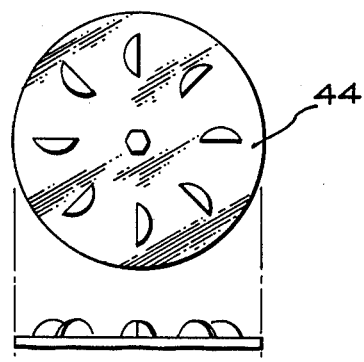
FIG_6
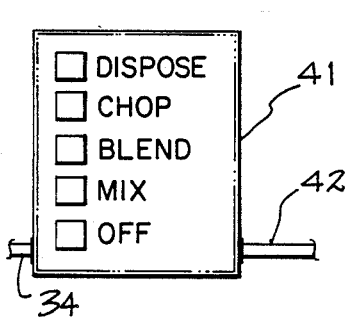
FIG_8
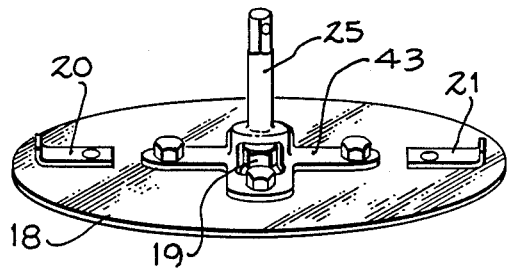
FIG_7

ICE SHAVING SYSTEM

TECHNICAL FIELD

This invention pertains generally to food processors, and more particularly to an apparatus for adapting a conventional food processor for use as a household appliance for shaving or crushing ice.

BACKGROUND

A typical ice shaver or crusher according to the prior art comprises a mechanical cutting member (e.g., a set of blades or teeth) coupled to a power source (e.g., an electric motor) for driving the cutting member. A typical food processor for domestic use conventionally comprises a set of rotary blades driven by an electric motor. However, domestic food processors are not designed (and are generally not suitable) as a system for use in shaving or crushing ice, because conventional food processors are not robust enough to drive a set of rotary blades quickly and continuously through solid ice without producing large amounts of excess waste due to melting. In addition, conventional food processors generally provide no means to handle waste due to melting or spills.

SUMMARY OF THE INVENTION

It is an object of the present invention to provide a food processing system that is adapted for use as an ice shaver or crusher.

It is also an object of the present invention to provide a means for adapting a conventional domestic food processor for use as an ice shaver or crusher. Specifically, in accordance with the present invention, a means is provided for driving the rotary blades of a conventional domestic food processor by means of the powerful electric motor of a domestic garbage disposal unit, and for making use of a household kitchen sink as a containment vessel for spills.

A domestic garbage disposal unit is typically installed underneath a kitchen sink, so that the shaft of a powerful electric motor is aligned coaxially with respect to an outflow pipe that extends vertically downward from an opening in the bottom of the sink. A chopping plate is secured to the shaft so as to rotate in a plane generally perpendicular to the shaft, as the shaft is turned when electric current is applied to the electric motor. Blade-like ridges or teeth-like projections are provided on an upper surface of the chopping plate. Kitchen refuse flushed from the sink through the outflow pipe comes into contact with the upper surface of the chopping plate. As the chopping plate is rotated, the ridges or projections thereon rip, slash and tear the kitchen refuse in contact therewith into small particles. A flow of water emptying from the sink flushes the small particles of kitchen refuse away from the upper surface of the chopping plate to a drain leading to a sewer.

In accordance with the present invention, the chopping plate of an otherwise conventional domestic garbage disposal unit is provided with a nub extending coaxially with respect to the electric motor shaft to which the chopping plate is secured. The nub is configured and is dimensioned to fit within a socket formed on one end of an elongate extension device. Also, in accordance with the present invention, the rotary blades of an otherwise conventional domestic food processor are secured to a shaft having a socket at one end thereof. The other end of the elongate extension device is configured and dimensioned to be coupled in mating engagement with the socket at the end of the shaft to which the blades of the food processor are secured. The elongate extension device serves to couple the shaft of the food processor to the shaft of the garbage disposal unit, whereby rotation of the blades of the food processor is powered by the motor of the garbage disposal unit.

DESCRIPTION OF THE DRAWING

FIG. 1 is a perspective view of a food processor whose rotary blades are driven by the electric motor of a domestic garbage disposal unit in order to function as an ice shaver or crusher in accordance with the present invention.

FIG. 2 is an elevation view, partly broken away, showing the rotary blades of the food processor of FIG. 1 coupled to the shaft of the electric motor of a domestic garbage disposal unit.

FIG. 3 is an exploded perspective view, partly in phantom outline, showing an elongate extension device in accordance with the present invention for coupling the rotary blades of the food processor of FIG. 1 to the shaft of the electric motor of the garbage disposal unit illustrated in FIG. 2.

FIG. 4 is a fragmentary elevation view, partly broken away, showing the rotary blades of the food processor of FIG. 1 secured to a end of the elongate extension device illustrated in FIG. 3. FIG. 5 is a perspective of a fork gear for coupling the shaft of the electric motor of the garbage disposal unit to the rotary blades of the food processor. FIG. 6 is a combination of elevation and plane views of a wheel gear for coupling the shaft of the electric motor of the garbage disposal unit to the rotary blades of the food processor. FIG. 7 is a perspective view of an alternative embodiment of the present invention in which the elongate extension device is secured to the chopping plate of the garbage disposal unit. FIG. 8 is an elevation view of a control unit for varying the speed and torque of the electric motor. FIG. 9 is a perspective view of another alternative embodiment of the present invention in which the elongate extension device is an extension of the shaft of the electric motor.

BEST MODE OF CARRYING OUT THE INVENTION

A food processor as illustrated in FIG. 1 conventionally comprises an elongate container 10, generally symmetrical about a central axis, with openings at both ends. A wider top end is dimensioned to receive food items into the container 10. A cover 11 fits over the top end when the food items in the container 10 are ready for processing. A narrower bottom end of the container 10 is dimensioned to receive (typically by screw-threaded engagement) a blade-carrying fixture 12 on which a set of blades is mounted for rotary motion about a shaft aligned with the central axis of the container 10. Processing of the food items in the container 10 involves rotating the blades on the blade-carrying fixture 12 by means of an electric motor to chop, blend or liquefy the food items.

Using a conventional food processor as illustrated in FIG. 1 to "process" a large quantity of ice (e.g., to crush a quantity of ice cubes filling the container 10 into shaved ice) requires a relatively powerful electric motor to rotate the blades on the blade-carrying fixture 12. Electric motors sold for use with domestic food processors are typically not powerful enough to enable such food processors to be used for crushing large quantities of ice. Electric motors built into domestic garbage disposal units, however, are typically powerful enough to drive rotary blades through relatively hard materials such as ice cubes.

In accordance with the present invention, as illustrated in FIG. 1, the bottom of the container 10 (with the blade-carrying fixture 12 secured thereto) is inserted into a drain opening at the bottom of a conventional kitchen sink 13. Also, in accordance with the present invention, a domestic garbage disposal unit is secured underneath the sink 13. An inflow end of the garbage disposal unit is in communication with the drain opening of the sink 13, and an outflow end thereof is in communication with a line leading to a sewer.

In a particular embodiment of the present invention, as illustrated in FIG. 2, a generally cylindrical outlet coupling fixture 14 is positioned in the drain opening at the bottom of the sink 13. An outwardly flanged end of the outlet coupling fixture 14 rests on an annular gasket surrounding the drain opening within the sink 13, and the outlet coupling fixture 14 extends through the drain opening to a position beneath the sink 13. The blade-carrying fixture 12 of the food processor fits within a bottom portion of the container 10, which is inserted into the outlet coupling fixture 14. The bottom portion of the container 10, is supported by an inwardly flanged end of the outlet coupling fixture 14.

The garbage disposal unit comprises a casing 15, which in the particular embodiment shown in FIG. 2 includes a frustoconical upper portion to which a cylindrical lower portion is secured. An open end of the upper portion of the casing 15 is secured in conventional manner (as illustrated in FIG. 2) to the outlet coupling fixture 14 so that kitchen refuse can be flushed from the sink 13 into the casing 15 when the drain opening of the sink 13 is not blocked by, e.g., a stopper for filling the sink 13 with water, or by a food processor for crushing ice in accordance with the present invention.

When the drain opening of the sink 13 is open (i.e., when the food processor as shown in FIGS. 1 and 2 is moved away from the drain opening, and when nothing else covers the drain opening), a continuing flow of water into the sink 13 flushes kitchen refuse through the drain opening into the interior of the casing 15. The lower portion of the casing 15 has a closed bottom wall, and a relatively powerful electric motor is secured underneath the casing 15 adjacent this bottom wall. A shaft 17 of the motor 16 extends through an aperture in the bottom wall of the casing 15 in axial alignment with the casing 15. Water-tight integrity of the bottom wall of the casing 15 is maintained by means of a bushing which surrounds the shaft 17 in the aperture through which the shaft 17 enters into the casing 15.

A chopping plate 18 positioned within the casing 15 adjacent (but spaced apart from) the bottom wall thereof is mounted on the shaft 17 for rotary motion. As illustrated in FIG. 2, the chopping plate 18 has a central aperture through which a screw-threaded distal end of the shaft 17 is received, and a conventional nut 19 is tightened over the distal end of the shaft 17 to secure the chopping plate 18 to the shaft 17. A pair of teeth-like projections 20 and 21 are secured to upwardly facing surface portions of the chopping plate 18.

Relatively small apertures 22 are provided on the cylindrical wall of the lower portion of the casing 15 adjacent the bottom wall thereof to serve as outlets from the casing 15 into an annular channel that is formed between the casing 15 and a surrounding housing. The annular channel communicates with a drain line 23, which leads to the sewer. In the particular embodiment illustrated in FIG. 2, an inlet pipe 24 is provided to feed water (as from, e.g. a conventional dishwasher) into the casing 15 in addition to the water that drains through the opening at the bottom of the sink 13. When the electric motor 16 is activated to rotate the shaft 17, the chopping plate 18 rotates therewith, and the projections 20 and 21 rip, slash and tear kitchen refuse on the chopping plate into fragments small enough to pass through the apertures 22 into the surrounding annular channel for passage to the sewer via the drain line 23.

In practicing the present invention, the garbage disposal unit is not used for the purpose of disposing of kitchen refuse. Instead, the motor 16 of the garbage disposal unit is utilized for the purpose of crushing ice (normally in the form of domestically produced ice cubes) filling the container 10 of the food processor. The present invention is realized by means of an elongate extension device 25, which mechanically couples the shaft 17 of the motor 16 to a shaft on which the blades of the blade-carrying fixture 12 are mounted.

The blade-carrying fixture 12 comprises a cylindrical base member 26, which is dimensioned to fit snugly within the bottom portion of the container 10, which is inserted into the outlet coupling fixture 14 when the food processor is to be used as an ice shaver or crusher. In a particular embodiment, grooves (indicated by reference number 40 in FIG. 3) are provided on the exterior surface of the cylindrical base member 26. The grooves 40 are generally vertical (i.e., perpendicular to the bottom of the sink 13 when the bottom portion of the container 10 is inserted into the outlet coupling fixture 14), whereby excess water can drain from the sink 13 into the casing 15.

In another embodiment, a drain hole (indicated by reference number 39) is provided near the bottom portion of the container 10. Excess liquid formed in the container 10 can pass through the drain hole 39 and flow downward along the exterior surface of the container 10 to the grooves 40 on the exterior surface of the cylindrical base member 26. Excess liquid from the container 10 mingles with excess liquid (if any) from the sink 13, and flows therewith along the grooves 40 into the casing 15 for passage via the surrounding annular channel into the drain line 23. A plug can be fitted into the drain hole 39 when passage of liquid therethrough is not appropriate.

There is no reason in principle to limit use of a system according to the present invention to the particular purpose of shaving or crushing ice. A system according to the present invention could also be used advantageously for chopping, blending, mixing, or otherwise processing any sort of material requiring a relatively powerful motor of the kind typically provided with a domestic garbage disposal unit to drive a set of rotary blades through the material.

It is also generally advantageous to be able to use the motor of a domestic garbage disposal unit for driving the rotary blades of a food processor through any sort of material (of whatever degree of hardness) that can be most conveniently processed in a sink, so that spills and overflows can be accommodated. In a preferred embodiment of a system according to the present invention, the outlet coupling fixture 14 is permanently installed in the drain opening of the sink 13. Thus, it would be advantageous for household kitchen sinks to be provided as a matter of course with fittings that function substantially as the outlet coupling fixture 14 disclosed herein.

The cylindrical base member 26 supports a rotary shaft 27 in alignment with the vertically extending shaft 17 of the electric motor 16. The shaft 27 is secured to the base member 26 in a conventional manner (as indicated in FIG. 2) for rotary motion with respect thereto. Mounted on an upper end of the shaft 27 by a conventional technique (e.g., by means of a screw 38 or a rivet) is an elongate blade member 28, which is preferably attached at its center to the end of the shaft 27.

Conventionally, opposite ends of the blade member 28 are bent in different directions (i.e., one end slanting upward and the other end slanting downward) to form a pair of oppositely extending blades so as to maximize contact with ice cubes (or other material) to be "processed" by rotation of the blade member 28 within the container 10. In accordance with the present invention, a lower end of the shaft 27 extends into the interior of the casing 15 and is configured to mate with an upper end of the extension device 25.

An ice shaver or crusher according to the present invention becomes operational by mating a lower end of the extension device 25 to the nut 19 that secures the chopping plate 18 to the shaft 17 of the motor 16, and by mating the lower end of the shaft 27 of the blade-carrying member 12 to the upper end of the extension device 25. In the embodiment illustrated in FIG. 3, the extension device 25 is a rod having a socket 29 at its lower end configured to fit in mating engagement over the nut 19. In alternative embodiments, the nut 19 and socket 29 could be replaced by other types of fixtures that are specifically designed to mate with each other. Thus, a fork gear 45 as shown in FIG. 5, or a wheel gear 44 as shown in FIG. 6, could be used.

In general, it is required that a nub (or alternatively, a structure having a depression) be integral with or secured to the chopping plate 18 so as to be received in (or alternatively, to receive) a matingly configured lower-end portion of the extension device 25. In an alternative embodiment, as shown in FIG. 7, the extension device 25 is permanently affixed as by a mounting bracket 43 to the chopping plate 18. The speed at which the chopping plate 18 rotates can be varied by a conventional switching device 41 (as illustrated in FIG. 8), which varies the torques of the motor 16. In yet another embodiment of the present invention, the extension device 25 is permanently secured (as by a screw-threaded connection 19 as illustrated in FIG. 9) to the shaft 17 of the electric motor 16.

Referring again to FIG. 4, the upper end of the extension device 25 is of square cross-sectional configuration and is dimensioned to fit within a correspondingly configured socket portion 31 (preferably of eight points for ease of mating) of the lower end of the shaft 27 of the blade-carrying member 12. In alternative embodiments, the upper end of the extension device 25 could be configured as, e.g., a socket, a wheel gear or a fork gear dimensioned to receive a correspondingly configured lower-end portion of the shaft 27. Alternatively, the extension device 25 could be permanently affixed to the blade-carrying fixture 12, or could be fitted with a ball-bearing locking device for securing the extension device 25 to the blade-carrying fixture 12.

The present invention has been described above and illustrated in the accompanying drawing in terms of certain preferred embodiments. However, further alternative embodiments would be readily apparent upon perusal of the foregoing description and drawing. It would be advantageous for garbage disposal units to include as "standard equipment" a chopping plate having a central nub specifically designed for mating with an extension device in accordance with the present invention. Extension devices could be made available in various (preferably standardized) lengths to accommodate various distances at which garbage disposal units are most advantageously installed under kitchen sinks. In fact, in accordance with the present invention, food processors could be marketed without electric motors (relying upon the electric motors built into domestic garbage disposal units), or garbage disposal units could be marketed with food processing units, thereby significantly decreasing the total cost of both units while saving counter space or storage space. Therefore, the foregoing description is to be understood as merely illustrative of the invention, which is defined more generally by the following claims and their equivalents.

I claim:

1. A system for reducing larger pieces of material to pieces of smaller size, said system comprising:
    (a) a container in which said larger pieces of said material are reduced to said pieces of smaller size, said container having an apertured top portion through which said larger pieces of said material are received and through which said pieces of smaller size are removed, said container having side and bottom portions that are substantially closed except for an opening in said bottom portion;
    (b) a cutting device;
    (c) a shaft carrying said cutting device, said shaft extending through said opening in said bottom portion of said container so that a first end of said shaft is located within said container and a second end of said shaft is located outside said container, said first end of said shaft being attached to said cutting device so as to support said cutting device for rotary motion within said container;
    (d) a fitting disposed in said opening in said bottom portion of said container, said fitting being configured to enable rotary motion of said shaft while substantially precluding said pieces of smaller size from leaving said container via said opening in said bottom portion of said container;
    (e) a sink having a drain opening, said drain opening being configured to receive said second end of said shaft carrying said cutting device;
    (f) an electric motor positioned underneath said sink so that a drive shaft of said motor is substantially aligned with said shaft carrying said cutting device; and
    (g) an elongate extension device for longitudinally coupling said drive shaft of said motor to said second end of said shaft carrying said cutting device, said elongate extension device having a first end connectable to said drive shaft of said motor and a second end connectable to said second end of said shaft carrying said cutting device so that said elongate extension device extends generally coaxially with respect to both said drive shaft of said motor and said shaft carrying said cutting device, rotary motion of said drive shaft of said motor thereby causing concomitant rotary motion of said shaft carrying said cutting device, said cutting device thereby being made to rotate in contact with said larger pieces of said material within said container so as to reduce them to said pieces of smaller size.

2. The system of claim 1 wherein said container for receiving said larger pieces of said material is a container for a food-processing type of appliance.

3. The system of claim 1 wherein said cutting device is a cutting fixture designed for use with said container in food-processing operations.

4. The system of claim 1 wherein said electric motor is a motor installed underneath said sink for a garbage-disposal type of appliance.

5. The system of claim 1 wherein said first end of said elongate extension device is configured and dimensioned as a socket to fit snugly over a nut secured to said drive shaft of said motor.

6. The system of claim 1 wherein said first end of said elongate extension device is configured and dimensioned to fit within a socket secured to said drive shaft of said motor.

7. The system of claim 1 wherein said second end of said elongate extension device is configured and dimensioned to be received in a socket formed at said second end of said shaft carrying said cutting device.

8. The system of claim 1 wherein said second end of said elongate extension device is configured and dimensioned as a socket to receive said second end of said shaft carrying said cutting device.

9. The system of claim 1 wherein said first end of said elongate extension device is affixed to a chopping plate of a garbage disposal unit, said chopping plate being secured to said drive shaft of said motor.

10. The system of claim 1 wherein said second end of said elongate extension device is coupled by means of a wheel gear to said second end of said shaft carrying said cutting device.

11. The system of claim 1 wherein said second end of said elongate extension device is coupled by means of a fork gear to said second end of said shaft carrying said cutting device.

12. The system of claim 1 wherein said motor is activated by an electric current control device for varying the speed and torque of said motor.

* * * * *